US007699764B2

(12) United States Patent
Ogawa et al.

(10) Patent No.: US 7,699,764 B2
(45) Date of Patent: Apr. 20, 2010

(54) FIXING ROLLER

(75) Inventors: Jun Ogawa, Gotemba-si (JP); Atsushi Ikeda, Numazu-si (JP)

(73) Assignee: Nitto Kogyo Co., Ltd., Tokyo (JP)

(*) Notice: Subject to any disclaimer, the term of this patent is extended or adjusted under 35 U.S.C. 154(b) by 1071 days.

(21) Appl. No.: 11/370,887

(22) Filed: Mar. 9, 2006

(65) Prior Publication Data

US 2006/0205578 A1 Sep. 14, 2006

(30) Foreign Application Priority Data

Mar. 11, 2005 (JP) ............................. 2005-068441
Feb. 27, 2006 (JP) ............................. 2006-049618

(51) Int. Cl.
*F16C 13/00* (2006.01)
*B21K 1/02* (2006.01)

(52) U.S. Cl. ............................. 492/56; 492/53; 492/48; 29/895.32; 29/895.3

(58) Field of Classification Search ................... 492/48, 492/49, 53, 56; 29/895.2, 895.21, 895.212, 29/895.23, 895.32, 895.3
See application file for complete search history.

(56) References Cited

U.S. PATENT DOCUMENTS 4,393,804 A * 7/1983 Nygard et al. ................. 118/60
4,887,340 A * 12/1989 Kato et al. ..................... 492/53
5,123,151 A * 6/1992 Uehara et al. ................. 492/56
5,195,228 A * 3/1993 Fukunaga et al. ............. 492/56
5,364,697 A * 11/1994 Miyabayashi ............... 428/323
5,403,656 A * 4/1995 Takeuchi et al. ............ 428/332
5,468,531 A * 11/1995 Kikukawa et al. .......... 428/36.5
5,520,600 A * 5/1996 Fukumoto .................... 492/56
5,640,662 A * 6/1997 Sugimoto et al. ........... 399/333
5,645,942 A * 7/1997 Sutoh ......................... 428/447
6,028,148 A * 2/2000 Miyabayashi ............... 525/478
6,390,961 B1 * 5/2002 Nakada et al. ................ 492/56
6,479,158 B1 * 11/2002 Kuntz et al. ................. 428/447
7,268,169 B2 * 9/2007 Hirayma et al. ............. 521/154
7,285,578 B2 * 10/2007 Hirayama et al. ........... 521/154

FOREIGN PATENT DOCUMENTS

JP 62269184 A * 11/1987
JP 63009715 A * 1/1988
JP 2004-053924 A 2/2004
JP 2004-053928 A 2/2004
JP 2004-053936 A 2/2004

(Continued)

OTHER PUBLICATIONS

English machine translation of JP 2004102232 A.*

*Primary Examiner*—Essama Omgba
(74) *Attorney, Agent, or Firm*—Westerman, Hattori, Daniels & Adrian, LLP

(57) ABSTRACT

Disclosed is a fixing roller which comprises a core 16, a porous material layer 22 disposed in surrounding relation to an outer peripheral surface of the core 16, and a thin-walled metal sleeve 26 covering an outer peripheral surface of the porous material layer 22. The porous material layer 22 comprises a closed cell-type silicone elastomer. The present invention provides a fixing roller capable of ensuring enhanced durability and maintaining a usable state over long periods under the condition of being actually driven and rotated.

17 Claims, 10 Drawing Sheets

FOREIGN PATENT DOCUMENTS

| | | | | |
|---|---|---|---|---|
| JP | 2004-102231 | A | | 4/2004 |
| JP | 2004102232 | A | * | 4/2004 |
| JP | 2004-205814 | A | | 7/2004 |
| JP | 2005-062534 | A | | 3/2005 |
| JP | 2006285216 | A | * | 10/2006 |
| JP | 2006323229 | A | * | 11/2006 |
| JP | 2007127883 | A | * | 5/2007 |
| JP | 2007322463 | A | * | 12/2007 |
| JP | 2008180979 | A | * | 8/2008 |

* cited by examiner

FIXING ROLLER

BACKGROUND OF THE INVENTION

1. Field of the Invention

The present invention relates to a fixing roller which includes a porous material layer covering an outer peripheral surface of a core and a thin-walled metal sleeve covering an outer peripheral surface of the porous material layer 2. Description of the Related Art In an image forming apparatus, such as a copying machine, a printer or a facsimile machine, as a fixing device for heating/pressing/fixing on a target object (a transfer member, a photosensitive sheet, a dielectric-coated sheet, etc.) unfixed toner image formed/supported, in conformity to intended image information, on the target object in a transfer manner (indirect manner) or a direct manner through an appropriate imaging process mechanism, such as an electrophotographic process, an electrostatic recording process or a magnetic recording process, there has been widely known a so-called two-roller type device arrangement comprising a thermal-fixing roller and a pressing roller.

In connection with this type of fixing roller, as disclosed in Japanese Patent Laid-Open Publication No. 2004-53924 (Patent Publication 1), the assigner of his application provided "a fixing roller production method comprising: a first step of preparing a porous body which comprises a core and a porous material layer formed to have at least closed cells and disposed in surrounding relation to an outer peripheral surface of the core, and machining the porous body to have an outer diameter equal to or greater than an inner diameter of a thin-walled metal; a second step of applying an adhesive onto at least one of an outer peripheral surface of the porous body and an inner peripheral surface of the thin-walled metal sleeve; a third step of containing the porous body and the thin-walled metal sleeve in a pressurized container to apply pressure thereon in such a manner as to allow the porous body to have an outer diameter less than an inner diameter of the thin-walled metal sleeve; a fourth step of, within the pressurized container, inserting the porous body into the thin-walled metal sleeve to form a sleeve body; a fifth step of taking the sleeve body from the pressurized container to cause expansion of the porous body so as to allow an outer peripheral surface of the porous body to be brought in close contact with an inner surface of the thin-walled metal sleeve; and a sixth step of solidifying the adhesive to bond the porous body and the thin-walled metal sleeve together.". This method would produce a fixing roller capable of maintaining a usable state over a long period of time under the condition of being actually driven and rotated.

In the technique disclosed in the Patent Publication 1, a foamed silicone rubber sponge (hereinafter refereed to simply as "silicone sponge") is used as an elastic layer. The silicone sponge has problems specific thereto, such as unevenness in cell size and indetermination in cell shape. Thus, in a fixing roller produced by the method disclosed in the Patent Publication 1, a region deformed by an action of an external force has the risk of occurrence of cell collapse. If cell collapse occurs, the durability of the fixing roller will deteriorate. Thus, there is a strong need for solving this problem.

SUMMARY OF THE INVENTION

In view of the above circumstances, it is an object of the present invention to provide a fixing roller capable of maintaining a usable state over long periods under the condition of being actually driven and rotated, without using silicone sponge as an elastic layer.

In order to solve the aforementioned problem and achieve the above object, the present invention provides a fixing roller which comprises a core, a porous material layer comprising a closed cell-type silicone elastomer prepared using an emulsion composition. The porous material is disposed in surrounding relation to an outer peripheral surface of the core. The fixing roller further includes a thin-walled metal sleeve covering an outer peripheral surface of the porous material layer.

In the fixing roller of the present invention, the silicone elastomer forming the porous material layer may have a plurality of cells with a closed cell ratio of 60% or more. Ones of the cells accounting for 50% or more of a total cell number may individually have a diameter of 50 μm or less.

In the above fixing roller, each of the cells accounting for 50% or more of the total cell number may satisfy the following formula (A):

$$0 \leqq (m-n)/m \leqq 0.5 \quad \text{(A)},$$

wherein m represents a maximum diameter of the cell, and n represents a minimum diameter of the cell.

In the above fixing roller, each of the cells accounting for 50% or more of the total cell number may satisfy the following formula (B):

$$0 \leqq (m-n)/n \leqq 0.5 \quad \text{(B)},$$

wherein m represents a maximum diameter of the cell, and n represents a minimum diameter of the cell.

Further, the silicone elastomer may have an average cell diameter of 30 μm or less.

In the above fixing roller, the silicone elastomer may have a closed-cell ratio of 80% or more.

In the above fixing roller, each of the cells may have a diameter ranging from 0.1 μm to 70 μm.

In the fixing roller of the present invention, the porous material layer may be prepared using a water-in-oil emulsion composition which contains a liquid silicone rubber material curable to form a silicone elastomer, a silicone oil material having a surface-active function, and water.

The fixing roller of the present invention may include a release layer formed around the outer peripheral surface of the thin-walled metal sleeve.

The above fixing roller may further include an elastic layer interposed between the release layer and the thin-walled metal sleeve.

The fixing roller of the present invention may include an elastic layer formed on the outer peripheral surface of the thin-walled metal sleeve.

The fixing roller of the present invention may include a release layer formed on an outer peripheral surface of the elastic layer.

In the above fixing roller, the release layer may be made of fluororesin.

In this case, the fluororesin may be coated on an outer peripheral surface of the elastic layer.

Alternatively, the fluororesin may be formed in a tube shape, and cover over an outer peripheral surface of the elastic layer.

As above, the present invention provides a fixing roller capable of ensuring enhanced durability without using silicone sponge as an elastic layer and maintaining a usable state over long periods under the condition of being actually driven and rotated.

In the present invention, the porous body as an elastic layer and the thin-walled metal sleeve are bonded together. The makes it possible to avoid a relative circumferential-movement between an outer peripheral surface of the porous material layer and an inner peripheral surface of the thin-walled metal sleeve to reliably prevent occurrence of an unusable state of the fixing roller due to wearing or crumbling of the outer peripheral surface of the porous material layer to provide enhanced reliability of the fixing roller.

Further, the porous body and the thin-walled metal sleeve bonded together makes it possible to reliably prevent the inner peripheral surface of the thin-walled metal sleeve from being displaced axially relative to the outer peripheral surface of the porous material layer so as to reliably prevent occurrence of cracks due to stress concentration which is otherwise caused by contact of the edge of the porous material layer with the thin-walled metal sleeve to provide enhanced reliability of the fixing roller.

Other features and advantages of the present invention will be apparent from the accompanying drawings and from the detailed description.

DETAILED DESCRIPTION OF THE PREFERRED EMBODIMENTS OF THE INVENTION

Figure 1:
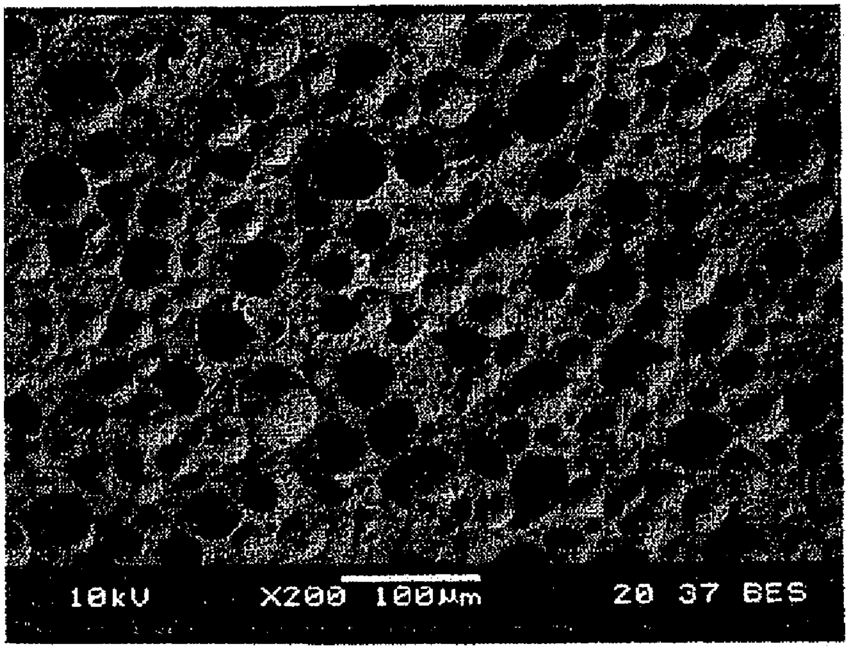
FIG. 1 is a SEM photograph showing a section of a silicone elastomer material obtained in Inventive Example 1.

With reference to the drawings, the structure of a fixing roller according to one embodiment the present invention and the steps of a fixing roller production method according to one embodiment the present invention will now be described. In the following description, a fixing roller of the present invention will be described in detail based on one case where it is applied as a thermal-fixing roller for a two-roller type fixing device.

The description will be made in the following order. Firstly, a non-foamed porous material, more specifically a porous material prepared using an emulsion, to be used as a characteristic component of the thermal-fixing roller according to the embodiment of the present invention will be described in detail. Secondly, a fixing device to be equipped with the fixing roller according to the embodiment of the present invention will be described, and further the structure of the fixing roller according to the embodiment of the present invention will be described. Lastly, a production method for this fixing roller will be described.

The structure and composition of the porous material to be used in the present invention will be described in detail below. In advance of this description, as a publication disclosing a sponge-forming composition prepared using an emulsion, the technical content of Japanese Patent Laid-Open Publication No. 2005-62534 (Patent Publication 2) will be described.

This Patent Publication 2 discloses a silicone rubber sponge-forming composition, and includes the description about capability to form fine and evenly-sized cells. However, the Patent Publication 2 does not include any description about the shape of cells in a sponge formed from the sponge-forming composition to be achieved by a technique disclosed therein. For example, while a porous material to be formed by a technique of the present invention has an effect of being able to exhibit a given strength against external forces so as to achieve high resistance against cell collapse, based on cells having a spherical shape, as described in detail later, the sponge disclosed in Patent Publication 2 cannot achieve this effect.

In this embodiment, the porous material is a closed cell-type silicone elastomer porous material. More specifically, the porous material can be expressed as a material comprising a matrix formed of a silicone elastomer and a large number of closed cells dispersed/distributed over the matrix.

This silicone elastomer porous material is a substantially closed cell-type silicone elastomer porous material which has a plurality of cells in a closed cell ratio of 60% or more, and ones of the cells accounting for 50% or more of a total cell number individually have a diameter of 50 μm or less.

As described later in detail, if the closed cell ratio or a ratio of the number of closed cells to the total cell number is less than 60%, the strength of the porous material will deteriorate.

Further, each of the cells of the silicone elastomer porous material has a diameter ranging from 0.1 to 70 μm, and may has a diameter ranging from 0.1 to 60 μm. In the silicone elastomer porous material of the present invention, the cells each having a diameter of 50 μm or less may account for 80% or more of the total cell number.

In the silicone elastomer porous material, each of the cells accounting for 50% or more of the total cell number may satisfy the following formula (A).

$$0 \leqq (m-n)/m \leqq 0.5 \quad \text{(A):}$$

(wherein m represents a maximum diameter of the cell, and n represents a minimum of the cell)

The formula (A) is a measure of how the cell is close to a perfect sphere (sphericity).

In the silicone elastomer porous material, each of the cells accounting for 50% or more of the total cell number may satisfy the following formula (B).

$$0 \leqq (m-n)/n \leqq 0.5 \quad \text{(B):}$$

In the formulas (A) and (B), the maximum diameter "m" means a maximum distance of a straight line which connects between two points on a sectional outline of each of the cells of the silicone elastomer porous material and passes thorough approximately the center of the cell, and the minimum diameter "n" means a minimum distance of a straight line which connects between two points on a sectional outline of each of the cells and passes thorough approximately the center of the cell. More specifically, an image of an arbitrary section of the silicone elastomer porous material is taken using a scanning electron microscope (SEM), and the maximum diameter "m" and the minimum diameter "n" of each cell are measures in a region having about 100 to 250 cells. This measurement may be manfully conducted using a micrometer caliper. An average cell diameter may be measured through an image processing. For example, the image processing may be performed using the analysis software "V10 for Windows 95® Version 1.3" produced by TOYOBO Ltd.

A diameter of each of the cells is equivalent to a value obtained by dividing a sum of a maximum "m" and a minimum diameter "n" of the cell by 2. It is understood that, when the cell has a perfect spherical shape, the maximum "m" becomes equal to the minimum diameter "n".

The silicone elastomer porous material may have an average cell diameter of 30 μm or less, or may have an average cell diameter of 10 μm or less.

When the above region having about 100 to 250 cells exhibits cell-size characteristics closer to those of the entire porous material, the porous material of the present invention is more even in cell size. In other words, the porous material of the present invention exhibits the cell-size characteristics defined in the present invention (the cell size, the average cell size, the ratio of the number of the cells each having a diameter of 50 μm or less to the total cell number, and/or the sphericity) in a rectangular region having 100 to 250 cells in arbitrary section thereof. It has been verified that cell-size characteristics in the arbitrary sectional region can represent cell-size characteristics of the entire porous material, for example, having a maximum size of 160 mm (width)×400 mm (length)×15 mm (thickness). Heretofore, there has not been any porous material which exhibits the cell-size characteristics defined in the present invention in the rectangular region having 100 to 250 cells.

As previously mentioned, this silicone elastomer porous material is a substantially closed cell-type. A ratio of the number of closed cells to the total cell number of the porous material can be expressed by a "closed cell ratio". This closed cell ratio can be measured in a manner as described later in connection with Examples. The silicone elastomer porous material of the present invention may has a closed cell ratio of 60% or more, and may has a closed cell ratio of 80% or more.

Fundamentally, this silicone elastomer porous material may be prepared using a water-in-oil emulsion which contains a liquid silicone rubber material curable to form a silicone elastomer, and water. In this case, if the liquid silicone rubber material has a low viscosity, the liquid silicone rubber material and water may be sufficiently stirred to form an emulsion. Then, immediately after the stirring, the emulsion may be heated and cured. Preferably, the silicone elastomer porous material of the present invention is prepared using a water-in-oil emulsion composition which contains a silicone oil material having a surface-active function (surface-active silicone oil material), together with a liquid silicone rubber material curable to form a silicone elastomer, and water.

The liquid silicone rubber material is not limited to a specific material as long as it is thermally curable to form a silicone elastomer. Preferably, a so-called addition reaction-curable liquid silicone rubber is used as the liquid silicone rubber material. The addition reaction-curable liquid silicone rubber comprises polysiloxane having an unsaturated aliphatic group and serving as a primary component, and active-hydrogen-containing polysiloxane serving as a crosslinking agent. In the polysiloxane having an unsaturated aliphatic group, the unsaturated aliphatic group may be introduced as end groups or may be introduced as a side chain group. For example, the polysiloxane having an unsaturated aliphatic group can be expressed by the following formula (1):

(1)

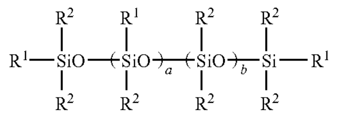

In the formula (1), $R^1$ represents an unsaturated aliphatic group, and $R^2$ represents either one of groups consisting of $C_1$ to $C_4$ lower alkyl, fluorine-substituted $C_1$ to $C_4$ lower alkyl and phenyl. Typically, a+b=50 to 2000. The unsaturated aliphatic group represented by $R^1$ is typically a vinyl group. Each $R^2$ is typically a methyl group.

The active-hydrogen-containing polysiloxane (hydrogen polysiloxane) acts on the polysiloxane having an unsaturated aliphatic group, as a crosslinking agent, and has a hydrogen atom (active hydrogen) bonded to a silicon atom in the main chain. Preferably, the active-hydrogen-containing polysiloxane has three or more hydrogen atoms per molecule. For example, the active-hydrogen-containing polysiloxane can be expressed by the following formula (2):

(2)

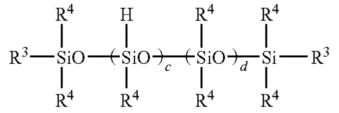

In the formula (2), $R^3$ represents a hydrogen atom or a $C_1$ to $C_4$ lower alkyl group, and $R^4$ represents a $C_1$ to $C_4$ lower alkyl group. Typically, c+d=8 to 100. The lower alkyl group represented by $R^3$ or $R^4$ is typically a methyl group.

The liquid silicone rubber material is commercially available. In the commercially-available products, the unsaturated aliphatic group-containing polysiloxane and the active-hydrogen-containing polysiloxane as components of an addition reaction-curable liquid silicone rubber are offered as separate packages, and an after-mentioned curing catalyst required for curing the two components is added to the active-hydrogen-containing polysiloxane. It is understood that two types of liquid silicone rubber materials may be used in combination.

The surface-active silicone oil material acts as a dispersion stabilizer for stably dispersing water in an emulsion. Specifically, the surface-active silicone oil material exhibits an affinity to both water and the liquid silicone rubber material. Preferably, this silicone oil material has a hydrophilic group, such as an ether group. Typically, this silicone oil material exhibits a HLB value of 3 to 13, preferably 4 to 11. More preferably, two types of ether-modified silicone oils different in HLB value at 3 or more are used in combination. In this case, preferably, first ether-modified silicone oil having a HLB value of 7 to 11 is used in combination with second ether-modified silicone oil having a HLB value of 4 to 7. Each of the ether-modified silicone oils may have a polyether introduced in a side chain of polysiloxane. For example, the ether-modified silicone oil can be expressed by the following formula (3):

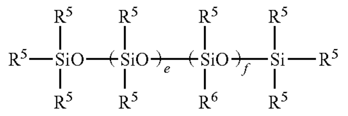

(3)

In the formula (3), $R^5$ represents a $C_1$ to $C_4$ lower alkyl group, and $R^6$ represents a polyether group. Typically, e+f=8 to 100. The lower alkyl group represented by $R^5$ is typically a methyl group. The polyether group represented by $R^6$ typically includes $(C_2H_4O)_X$ group, $(C_3H_6O)_Y$ group or $(C_2H_4O)_X(C_3H_{60})_Y$ group. The HLB value is primarily determined by the numbers x and y. The surface-active silicone oil material is commercially available.

It is understood that water dispersedly exists in the water-in-oil emulsion in the discontinuous phase in the form of particles (water droplets). As described later, a particle size of each of the water particles will substantially determine a diameter of each cell (pore) of the silicone rubber porous material of the present invention.

The water-in-oil emulsion may include a curing catalyst for curing the liquid silicone rubber material. As is well known, a platinum catalyst may be used as the curing catalyst. The platinum catalyst may be used in an amount of about 1 to 100 weight ppm to obtain a sufficient catalytic effect. The curing catalyst may be added to the water-in-oil emulsion during the process of preparing the silicone elastomer porous material, or during the process of preparing the water-in-oil emulsion.

In the above water-in-oil emulsion, in view of obtaining an emulsion particularly excellent in water-dispersion stability, the surface-active silicone oil material and water are preferably mixed together, respectively in an amount of 0.2 to 5.5 weight parts and in an amount of 10 to 250 weight parts with respect to 100 weight parts of the water-in-oil emulsion. The emulsion excellent in water-dispersion stability can be used to prepare the porous material more stably and adequately.

When the surface-active silicone oil material consists of a combination of the aforementioned first ether-modified silicone oil and the aforementioned second ether-modified silicone oil, the first ether-modified silicone oil and the second ether-modified silicone oil are preferably used, respectively, in an amount of 0.15 to 3.5 weight parts and in an amount of 0.05 to 2 weight parts (total 0.2 to 5.5 weight parts) with respect to 100 weight parts of the liquid silicone rubber material. When the liquid silicone rubber material consists of a combination of unsaturated aliphatic group-containing polysiloxane and active-hydrogen-containing polysiloxane, a weight ratio of the former to the latter is preferably in the range of 6:4 to 4:6.

The silicone elastomer porous material may include various additives according to intended purposes. The additive may include a coloring agent (pigment, dye), a conductivity-imparting material (carbon black, metal power, etc.), filler (silica, etc.). These additives may be mixed in the water-in-oil emulsion. For example, in order to adjust the viscosity of the emulsion for the purpose of facilitating degassing, the water-in-oil emulsion composition may contain unreactive silicone oil. The water-in-oil emulsion having a viscosity of 1 to 2 cSt is advantageous to handling because it can facilitate degassing.

The water-in-oil emulsion may be prepared through various processes. Typically, the water-in-oil emulsion is prepared by mixing the liquid silicone rubber material, the surface-active silicone oil material, water and optionally the additive, and sufficiently stirring the mixture. When the liquid silicone rubber material consists of a combination of unsaturated aliphatic group-containing polysiloxane and active-hydrogen-containing polysiloxane, the unsaturated aliphatic group-containing polysiloxane and a part of surface-active silicone oil material may be mixed together and stirred to obtain a first mixture, and the active-hydrogen-containing polysiloxane and the remaining surface-active silicone oil material may be mixed together and stirred to obtain a second mixture. Then, the first and second mixture may be mixed together and stirring while gradually adding water thereinto to obtain an intended emulsion.

It is understood that the preparation process for the water-in-oil emulsion is not limited to the above process. The liquid silicone rubber material, the surface-active silicone oil material, water and an optional additive may be mixed together in any suitable order. The stirring for forming a desirable water-in-oil emulsion composition may be performed by operating a stirring device, for example, at a rotation speed of 300 to 1000 rpm. After completion of the emulsification process, the water-in-oil emulsion may be subjected to a degassing process using, for example, a vacuum depressurization device, without heating, to remove air mixed in the emulsion.

In a process for preparing the silicone elastomer porous material using the obtained water-in-oil emulsion, the water-in-oil emulsion may be placed in a thermally curing condition of the liquid silicone rubber material (primary heating) under the presence of a curing catalyst. Preferably, in order to thermally cure the liquid silicone rubber material without vaporization of water in the emulsion, the primary heating process is heated at a temperature of 130° C. or less. The heating temperature during the primary heating process is typically 80° C. or more, and a heating time is typically about 5 to 60 minutes. Through this primary heating process, the liquid silicone rubber material is cured to allow water particles in the emulsion to be confined therein in an emulsified state. The silicone rubber is cured to have a strength resistive to an expansion force during vaporization of the water in an after-mentioned secondary heating.

Then, in order to remove the water confined in the cured silicone rubber therefrom, a secondary heating process is performed. Preferably, this secondary heating process is performed at a temperature of 70 to 300° C. If the heating temperature is less than 70° C., it needs to take a long time period for removing the water. If the heating temperature is greater than 300° C., the cured silicone rubber will deteriorate. At the heating temperature of 70 to 300° C., the water will be vaporized and removed within 1 to 24 hours. Through the secondary heating process, the water is vaporized and removed, and the final curing of the silicone rubber material is achieved. The vaporized/removed water leaves a plurality of cells each having an approximately the same as a particle sizes of a corresponding one of the water particles.

In this manner, the silicone elastomer porous material can be prepared using the water-in-oil emulsion without a foaming phenomenon. In addition, the water particles in the water-in-oil emulsion is confined in the silicone rubber cured through the primary heating process, and simply evaporated during the secondary heating.

The above porous material will be more specifically described below in connection with a plurality of Examples. It is understood that the porous material of the present invention is not limited to these Examples.

In the following Examples, the closed cell ratio was determined as follows.

<Measurement of Closed Cell Rate>

The silicone elastomer porous material of the present invention has a high surface tension, and a plurality of micro-cells. Thus, water hardly gets thereinto. From this standpoint, a surface acting agent or surfactant is used to provide enhanced wettability relative to water to the silicone elastomer porous material.

Specifically, a surface layer (about 1.0 mm from a surface) of the prepared silicone elastomer porous material, and a weight of the post-removal porous material (pre-water-absorption porous material weight) is measured. This porous material is immersed in a mixed solution of 100 weight parts of water and 1 weight part of hydrophilic silicone oil [polyether-modified silicone oil (KF-618 produced by Shin-Etsu Chemical Co., Ltd.)], and left under reduced pressure for 10 minutes. Then, after returning to atmospheric pressure, the porous material is taken out of the mixed solution, and water attached onto the surface of the porous material is fully wiped up. Then, a weight of the porous material (pre-water-absorption porous material weight) is measured. A water absorption rate, an open cell ratio and a closed cell ratio are sequentially calculated using the following formulas.

Water absorption rate (%)={(post-water-absorption porous material weight−pre-water-absorption porous material weight)/pre-water-absorption porous material weight}×100

Open cell ratio (%)=(specific gravity of porous material×water absorption rate/100)/{specific gravity of mixed solution−(specific gravity of porous material/specific gravity of silicone elastomer)}×100

Closed cell ratio (%)=100−open cell ratio (%)

In the above formula, the specific gravity of silicone elastomer is a specific gravity of a silicone elastomer obtained by curing a liquid silicone rubber material, and described in a product catalogue.

Inventive Example 1

In Inventive Example 1, a liquid silicone rubber (trade name: KE-1353) available from Shin-Etsu Chemical Co., Ltd. was used as the liquid silicone rubber material. In this liquid silicone rubber, active-hydrogen-containing polysiloxane (viscosity: 16 Pa·S) and vinyl-group-containing polysiloxane (viscosity: 15 Pa·S) were offered as separate packages, and the vinyl-group-containing polysiloxane had a catalyst quantity of platinum catalyst added thereto. Hereinafter, the former and latter will be referred to, respectively, as “silicone rubber agent A” and “silicone rubber agent B”. The active-hydrogen-containing polysiloxane has the chemical structure of the formula (2) where each $R^4$ is a methyl group. The vinyl-group-containing polysiloxane has the chemical structure of the formula (1) where each $R^1$ is a vinyl group and each $R^2$ is a methyl group. Further, KF-618 (HLB: 11; hereinafter referred to as “dispersion stabilizer I) serving and KF-6015 (HLB: 4; hereinafter referred to as “dispersion stabilizer II) each of which is ether-modified silicone oil and available from Shin-Etsu Chemical Co., Ltd were used as a dispersion stabilizer. A silicone elastomer itself to be obtained from the liquid silicone rubber material used in Inventive Example 1 had a specific gravity of 1.04 (catalog value).

A mixture prepared by mixing 0.7 weight part of the dispersion stabilizer I and 0.3 weight parts of the dispersion stabilizer II was added to 50 weight parts of the silicone rubber agent A, and the obtained mixture was sufficiently stirred by a hand mixer for 5 minutes to form a mixture A. Further, a mixture prepared by mixing 0.7 weight part of the dispersion stabilizer I and 0.3 weight parts of the dispersion stabilizer II was added to 50 weight parts of the silicone rubber agent B, and the obtained mixture was sufficiently stirred by a hand mixer for 5 minutes to form a mixture B.

The mixture A and mixture B were mixed together. The obtained mixture was stirred by a hand mixer for 3 minutes while adding 10 weight parts of water, and further stirred for 2 minutes. The obtained mixture was stirred by the hand mixer while gradually adding 90 weight parts of water to obtain an emulsion.

The obtained emulsion was degassed within a vacuum depressurization device to remove a mixed air therefrom. Then, the emulsion was poured in a compression molding die having a depth of 6 mm, and molded using a pressure plate while heating at a setup temperature of 100° C. for 30 minutes (primary heating). The obtained molded body (precursor of a porous material) was heated in a heating furnace at 150° C. for 5 hours (secondary heating) to remove water therefrom. In this way, a rectangular plate-shaped silicone elastomer porous test piece having a length of 42 mm, a width of 20 mm and a thickness of 6 mm was prepared. This test piece was cut along a width direction. A obtained cut surface was observed by an SEM, and maximum and minimum diameters of each cell was measured by a micrometer caliper to determine cell-size characteristics. Further, a closed cell ratio of this test piece was measured. The result is shown in the following Table 1. As the measurement result, the porous elastomer obtained in Inventive Example 1 had a specific gravity of 0.66 and a hardness (Asher-C) of 40. A SEM photograph (magnification: ×100) of the cut surface of this test piece is shown in FIG. 1. In this way, a closed cell porous material having an extremely fine/even cell size could be obtained.

Inventive Example 2

In Inventive Example 2, a liquid silicone rubber (trade name: DY35-7002) available from Toray Dow Corning Co. Ltd was used as the liquid silicone rubber material. In this liquid silicone rubber, active-hydrogen-containing polysiloxane (viscosity: 15 Pa·S) and vinyl-group-containing polysiloxane (viscosity: 7.5 Pa·S) were offered as separate packages, and the vinyl-group-containing polysiloxane had a catalyst quantity of platinum catalyst added thereto. Hereinafter, the former and latter will be referred to, respectively, as “silicone rubber agent A” and “silicone rubber agent B”. The active-hydrogen-containing polysiloxane has the chemical structure of the formula (2) where each $R^4$ is a methyl group. The vinyl-group-containing polysiloxane has the chemical structure of the formula (1) where each $R^1$ is a vinyl group and each $R^2$ is a methyl group. Further, the aforementioned dispersion stabilizer I and dispersion stabilizer II were used as a dispersion stabilizer. A silicone elastomer itself to be obtained from the liquid silicone rubber material used in Inventive Example 1 had a specific gravity of 1.03 (catalog value).

A mixture prepared by mixing 0.7 weight part of the dispersion stabilizer I and 0.3 weight parts of the dispersion stabilizer II was added to 50 weight parts of the silicone rubber agent A, and the obtained mixture was sufficiently stirred by a hand mixer to form a mixture A. Further, a mixture prepared by mixing 0.7 weight part of the dispersion stabilizer 1 and 0.3 weight parts of the dispersion stabilizer II was added to 50 weight parts of the silicone rubber agent B, and the obtained mixture was sufficiently stirred by a hand mixer for 5 minutes to form a mixture B.

The mixture A and mixture B were mixed together. The obtained mixture was stirred by a hand mixer for 3 minutes while adding 10 weight parts of water, and further stirred for 2 minutes. The obtained mixture was stirred by the hand mixer while gradually adding 90 weight parts of water to obtain an emulsion.

Figure 2:
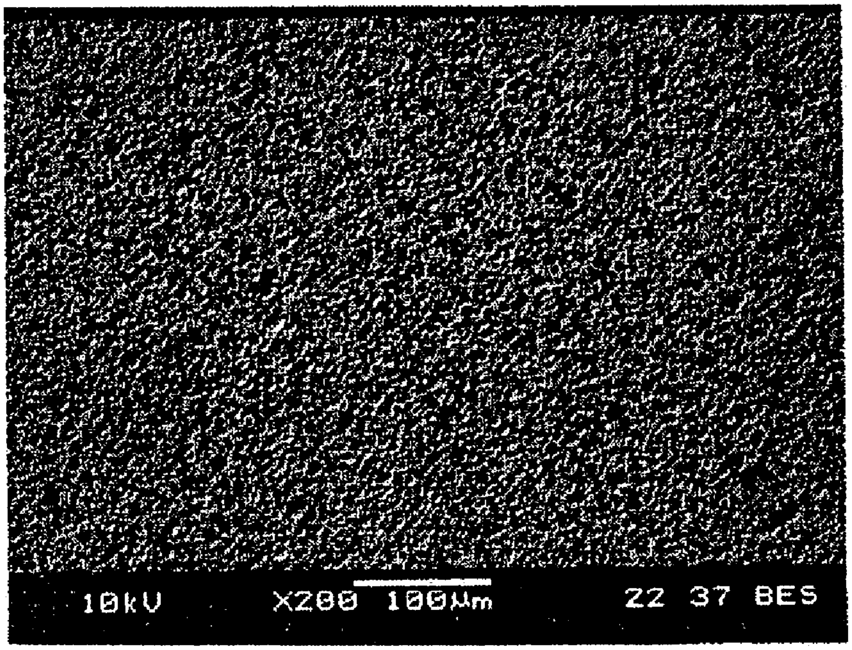
FIG. 2 is a SEM photograph showing a section of a silicone elastomer material obtained in Inventive Example 2.

In the same manner as that in Inventive Example 1, a silicone elastomer porous material test piece was prepared using the obtained emulsion, and the cell-size characteristics were measured to determine a closed cell ratio. The result is shown in the following Table 1. As the measurement result, the porous elastomer in Inventive Example 2 had a specific gravity of 0.55 and a hardness (Asher-C) of 56. A SEM photograph (magnification: ×100) of a cut surface of this test piece is shown in FIG. 2. In this way, a closed cell porous material having an extremely fine/even cell size could be obtained.

Inventive Example 3

In Inventive Example 3, the mixture A and mixture B used in Inventive Example 3 were mixed together. The obtained mixture was stirred by a hand mixer for 3 minutes while adding 10 weight parts of water, and further stirred for 2 minutes. The obtained mixture was stirred by the hand mixer while gradually adding 90 weight parts of water to obtain an emulsion.

In the same manner as that in Inventive Example 1, a silicone elastomer porous material test piece was prepared using the obtained emulsion, and the cell-size characteristics were measured to determine a closed cell ratio. The result is shown in the following Table 1. As the measurement result, the porous elastomer in Inventive Example 1 had a specific gravity of 0.53 and a hardness (Asher-C) of 58. A SEM photograph (magnification: ×100) of a cut surface of this test piece is shown in FIG. 2. In this way, a closed cell porous material having an extremely fine/even cell size could be obtained.

Inventive Example 4

In Inventive Example 3, the liquid silicone rubber material used in Inventive Example 2 and a liquid silicone rubber (trade name: DY35-615) available from Toray Dow Corning Co. Ltd. were used. In this liquid silicone rubber DY35-615, active-hydrogen-containing polysiloxane (viscosity: 113 Pa·S) and vinyl-group-containing polysiloxane (viscosity: 101 Pa·S) were offered as separate packages, and the vinyl-group-containing polysiloxane had a catalyst quantity of platinum catalyst added thereto. Hereinafter, the former and latter will be referred to, respectively, as "silicone rubber agent A" and "silicone rubber agent B". The active-hydrogen-containing polysiloxane has the chemical structure of the formula (2) where each $R^4$ is a methyl group. The vinyl-group-containing polysiloxane has the chemical structure of the formula (1) where each $R^1$ is a vinyl group and each $R^2$ is a methyl group.

A mixture prepared by mixing 0.7 weight part of the dispersion stabilizer I and 0.3 weight parts of the dispersion stabilizer II was added to a mixture of this silicone rubber agent A and the silicone rubber agent A used in Inventive Example 2 mixed together at a volume ratio of 50:50, and the obtained mixture was sufficiently stirred by a hand mixer for five to form a mixture A. Further, a mixture prepared by mixing 0.7 weight part of the dispersion stabilizer I and 0.3 weight parts of the dispersion stabilizer II was added to a mixture of the above silicone rubber agent B and the silicone rubber agent B used in Inventive Example 2 mixed together at a volume ratio of 50:50, and the obtained mixture was sufficiently stirred by a hand mixer for 5 minutes to form a mixture B.

The mixture A and mixture B were mixed together. The obtained mixture was stirred by a hand mixer for 3 minutes while adding 10 weight parts of water, and further stirred for 2 minutes. The obtained mixture was stirred by the hand mixer while gradually adding 90 weight parts of water to obtain an emulsion.

In the same manner as that in Inventive Example 1, a silicone elastomer porous material test piece was prepared using the obtained emulsion, and the cell-size characteristics were measured to determine a closed cell ratio. The result is shown in the following Table 1. A silicon elastomer itself to be obtained the liquid silicone rubber material used in Inventive Example 4 had a specific gravity of 1.07. Further, the porous material obtained in Inventive Example 4 had a specific gravity of 0.60 and a hardness (Asher-C) of 35.

Comparative Example 1

Figure 3:
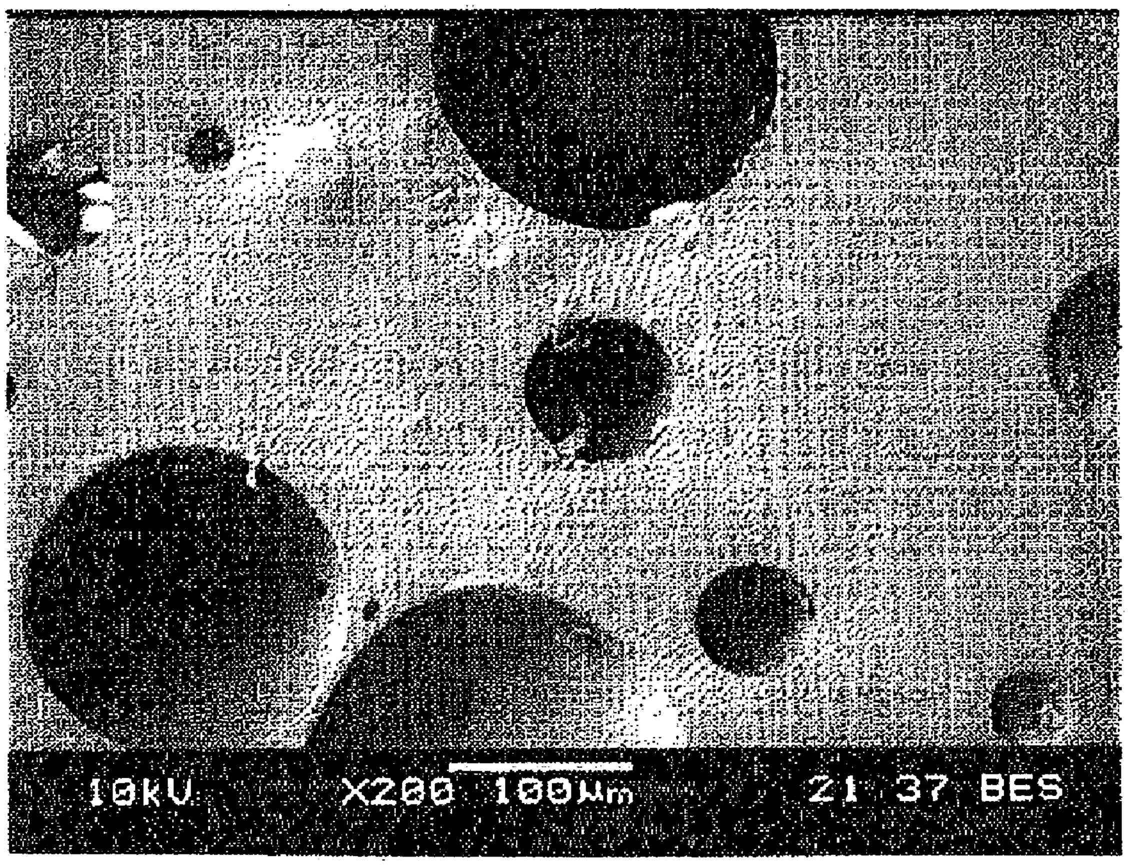
FIG. 3 is a SEM photograph showing a silicone elastomer material obtained in Comparative Example 1.

A pressing roller was detached from a printer Able 1405 produced by Fuji Xerox Co., Ltd., and a test piece was cut out from an elastic layer formed of a silicone elastomer porous material (foam prepared using 2,2-azobisisobutyronitrile as a foaming agent). In the same manner as that in Inventive Example 1, the cell-size characteristics and closed cell ratio of the test piece were measured. The result is shown in the following Table 1. A SEM photograph (magnification: ×100) of a cut surface of this test piece is shown in FIG. 3.

TABLE 1

Cell-Size Characteristics and Closed Cell Ratio of Porous Material

| Porous Martial Cell-Size Characteristics | Inventive Example 1 | Inventive Example 2 | Inventive Example 3 | Inventive Example 4 | Comparative Example 1 |
|---|---|---|---|---|---|
| Measurement Area ($mm^2$) | $2.54 \times 10^{-1}$ | $2.66 \times 10^{-3}$ | $9.47 \times 10^{-3}$ | $2.65 \times 10^{-2}$ | 7.51 |
| The number of cells | 179 | 105 | 122 | 250 | 146 |
| Minimum cell diameter | 9.1 | 1.1 | 2.3 | 1,.5 | 40.7 |
| Maximum cell diameter | 60.7 | 9.1 | 40.6 | 12.8 | 628 |
| Ratio of cells satisfying Formula (A) (%) | 100 | 100 | 100 | 100 | 65 |
| Ratio of cells satisfying Formula (B) (%) | 95 | 98.7 | 90.2 | 99.8 | 25 |
| Ratio of cells satisfying both Formulas (A) and (B) (%) | 95 | 98.7 | 90.2 | 99.8 | 16.3 |
| m − n (maximum) | 21 | 2.1 | 3.3 | 3.9 | 409 |

TABLE 1-continued

Cell-Size Characteristics and Closed Cell Ratio of Porous Material

| Porous Martial Cell-Size Characteristics | Inventive Example 1 | Inventive Example 2 | Inventive Example 3 | Inventive Example 4 | Comparative Example 1 |
|---|---|---|---|---|---|
| Ratio of cells with a diameter of 50 μm or less (%) | 96 | 100 | 100 | 100 | 1 |
| Average cell size | 28 | 4.7 | 6.6 | 4.9 | 207 |
| Closed cell ratio (%) | 98.4 | 98.2 | 99.2 | 99.7 | 90.5 |

(Fixing Device 10)

Figure 4:
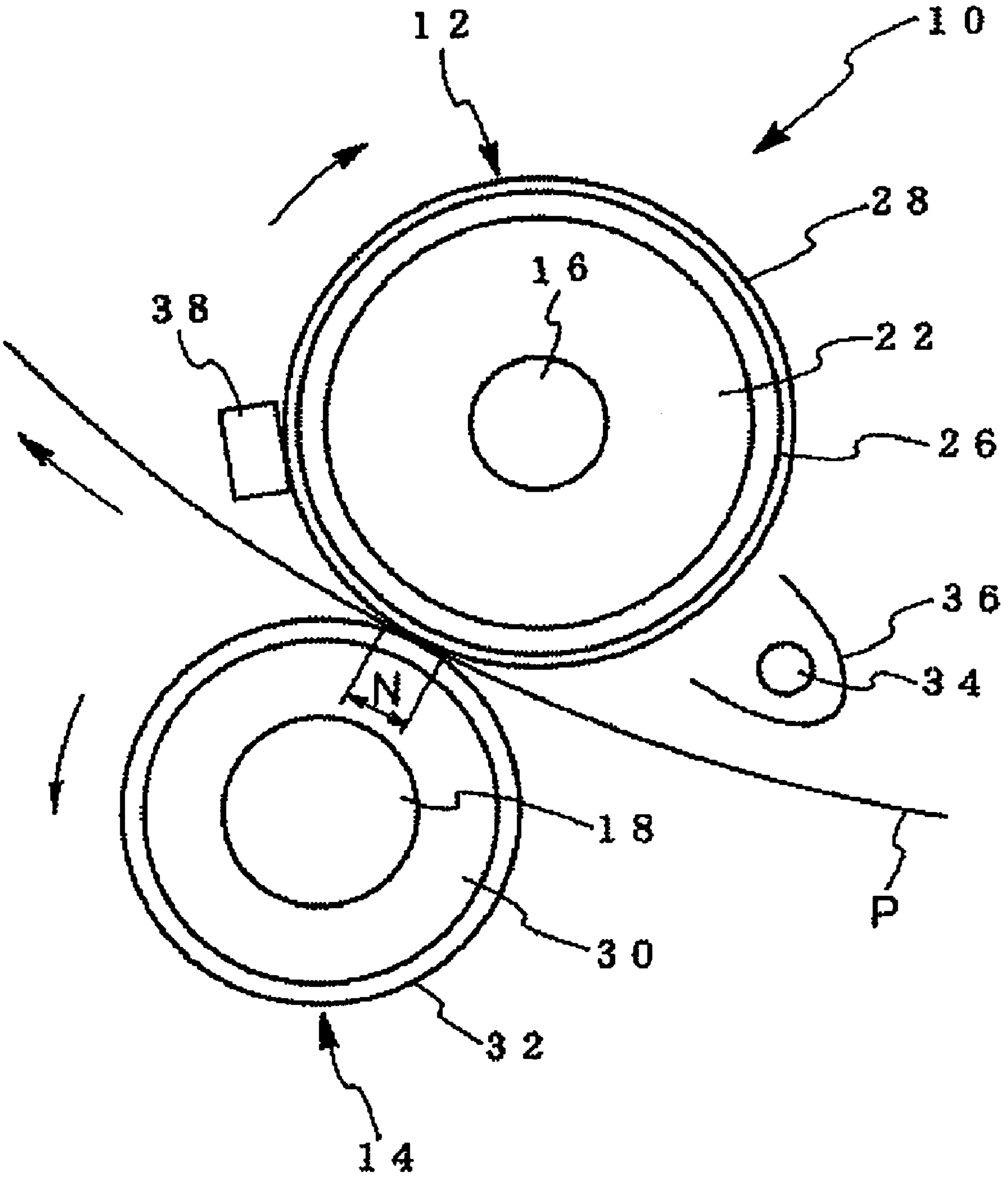
FIG. 4 is a schematic diagram showing a fixing device using a fixing roller according to one embodiment of the present invention.

A schematic structure of a fixing device 10 to be equipped with a fixing roller using the above porous material will be described with reference to FIG. 4. The fixing roller according to this embodiment is used as a fixing roller 12 as a heating/rotating member in this fixing device 10. In FIG. 4, the reference numeral 14 indicates a pressing roller as a pressing member disposed in contact with the fixing roller 12 at a given pressing force and rotatable driven the fixing roller 12. A thermistor 38 is disposed in contact with an outer peripheral surface of the fixing roller 10 to measure a surface temperature of the fixing roller 10.

This fixing roller 12 is designed to be rotatably driven in a direction indicated by the arrow by a driving device (not shown) through a drive gear (not shown) attached at an longitudinal end of a drive shaft made of metal, such as iron. The pressing roller 14 is rotatably driven in a direction indicated by the arrow by the fixing roller 12 to follow the rotation thereof while being pressed toward the fixing roller 12 by a pressing spring (not shown) through a bearing (not shown) attached to each of opposed longitudinal ends of an iron core 18 thereof. The reference numeral N indicates a press-contact nip zone where these rollers 12, 14 are in contact with one another.

(Fixing Roller 12)

Figure 5:
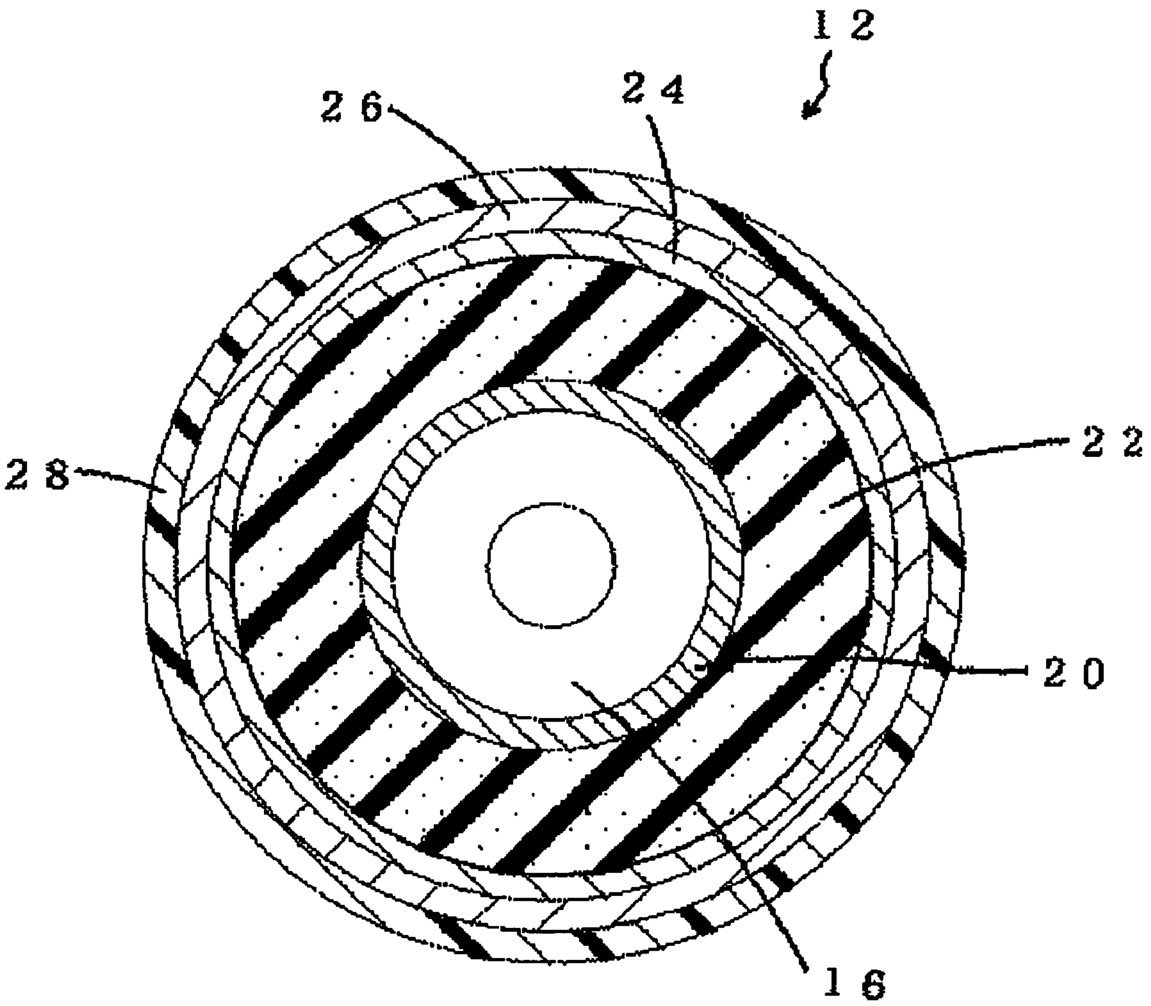
FIG. 5 is a sectional view showing a thermal-fixing roller using the fixing roller according to the embodiment.

The fixing roller 12 according to this embodiment is produced by an after-mentioned production method. As shown in FIG. 5 separately, the fixing roller 12 fundamentally comprises a core 16, a porous material layer disposed surrounding the core 16 through the primer 20, a thin-walled metal sleeve 26 bonded to the porous material layer 22 through an adhesive layer 24 to cover an outer peripheral surface of the porous material layer 22, and a release layer 28 disposed on an outer peripheral surface of the thin-walled sleeve 26 to cover the outer peripheral surface of the thin-walled sleeve 26.

In this embodiment, the porous material layer 22 is formed of a silicon elastomer having at least a plurality of closed cells or a closed cell-type silicon elastomer, as described in dental later. This porous material layer 22 is machined by an outer-surface grinding apparatus (not shown) in such a manner as to have an outer diameter greater than an inner diameter of the thin-walled metal sleeve 26 in a state before this porous material layer 22 is fittingly inserted into the thin-walled metal sleeve 26. Specifically, the thin-wall metal sleeve 26 is formed to have an inner diameter of 30.0 mm, and whereas the porous material layer 22 is machines to have a pre-insertion diameter of 30.5.

The thin-walled metal sleeve 26 includes a sleeve substrate **26*a* made, such as a highly heat-conductive metal material, such as iron, SUS or nickel. In this embodiment, a sleeve substrate 26*a* is formed as a nickel electroformed sleeve having an inner diameter of 30.0 mm and a wall thickness of 10 to 100 μm, preferably 30 to 50 μm. Specifically, a sleeve substrate 26*a* is formed as a thin-walled sleeve having a wall thickness of 35 μm. Further, silicon rubber is applied on an outer peripheral surface of this sleeve substrate 26*a* through a primer to form a silicon rubber layer 26*b*. Further, an outer peripheral surface of the silicone rubber layer 26*b* is covered by a tube made of fluororesin, such as perflouroalkyl-tetrafluoroethylene copolymer (PFIT), defining a release layer 28**.

The silicone rubber layer **26*b* has a wall thickness arranged to be 200 μm after curing of the silicon rubber. The PFA tube defining the release layer 28 has a wall thickness of 30 μm. A adhesive layer (not shown) bonding between the silicone rubber layer 26*b* and the release layer 28** has a thickness of about 30 μm. For example, an adhesive to be used for forming the adhesive layer may be a silicone rubber-based adhesive, such as two-component LTV (trade name: SE 1700 available from Toray Dow Corning Co. Ltd). Further, RTV (trade name: KE 45 available from Shin-Etsu Chemical Co., Ltd.) may also be used.

A process for preparing this thin-wall metal sleeve 26 will be briefly described below. The sleeve substrate **26*a* is prepared by using an electroforming belt production apparatus (not shown), and a primer is applied on the outer peripheral surface of the sleeve substrate 26*a***. After drying the primer, silicon rubber is applied on the dried primer in such a manner as to have a thickness of 200 μm after curing thereof, and then cured.

Then, an adhesive is applied on the outer peripheral surface of the silicone rubber layer **26*b* defined by the cured silicone rubber, at a thickness of about 30 μm, and the PFA tube is fitted to cover the silicone rubber layer 26*b* in such a manner as to be bonded thereto through the adhesive. Then, the adhesive is cured to allow the release layer 28 consisting of the PFA tube to be bonded to the outer peripheral surface of the silicone rubber layer 26*b* to form a thin-walled metal sleeve. This thin-walled metal sleeve is cut into a given length to prepare a desired thin-walled metal sleeve 26**.

In this way, the thin-walled metal sleeve 26 having an outer peripheral surface with the release layer 28 can be prepared.

In order to bond the porous material layer 22 and the thin-walled metal sleeve 26 together, the adhesive layer 24 is applied onto at least either one of the outer peripheral surface of the porous material layer 22 and an inner peripheral surface of the thin-walled metal sleeve 26. In this embodiment, the adhesive layer 24 is applied onto the entire outer peripheral surface of the porous material layer 22 before the thin-walled metal sleeve 26 is fitted on this outer peripheral surface.

An adhesive to be used for forming the adhesive layer 24 may be a silicone rubber-based adhesive. In this embodiment, as with the adhesive for bonding between the silicone rubber layer **26*b* and the release layer 28**, two-component LTV (trade name: SE 1700 available from Toray Dow Corning Co. Ltd) is used as this adhesive. Further, RTV (trade name: KE 45 available from Shin-Etsu Chemical Co., Ltd.) may also be used.

Preferably, this adhesive layer 24 has a thickness of 5 to 200 μm, particularly about 50 μm, based on calculation from an amount of applied adhesive. If the thickness of the adhesive layer 24 is less than 5 μm, an adequate strength cannot be ensured. If thickness of the adhesive layer 24 is greater than 200 μm, an heat insulation effect of the porous layer 22 will be undesirably spoiled. Thus, the thickness of the adhesive layer 24 is preferably set in the range of 5 to 200 μm.

The porous material layer 22 and the thin-walled metal sleeve 26 are bonded together in the above manner. Thus, even if a frictional contact force between the thin-walled metal sleeve 26 and the pressing roller 14 is increased in a rotating state of the fixing roller 12, a relative rotation between the porous material layer 22 and the thin-walled metal sleeve 26 can be avoided to achieve a significant effect of being able to prevent occurrence of an unusable state of the fixing roller 12 due to wearing or crumbling of the outer peripheral surface of the porous material layer 22.

Further, in the rotating state of the fixing roller 12, the thin-walled metal sleeve 26 is adhesively fixed to the porous material layer 22. This males it possible to reliably prevent the thin-walled metal sleeve 26 from being displaced axially relative to the porous material layer 22, and provide another significant effect of being able to reliably prevent occurrence of cracks due to stress concentration which is otherwise be caused by the axial displacement of the thin-walled metal sleeve 26 relative to the porous material layer 22.

If a silicone rubber-based adhesive is used as the adhesive forming the adhesive layer 24, given softness and elasticity of the adhesive itself can be effectively utilized. Specifically, when the soft porous material layer 22 is bonded to the hard thin-walled metal sleeve 26, the adhesive can effectively absorb a difference in hardness therebetween to provide a significant effect of being able to prevent occurrence of stresses.

As mentioned above, the adhesive layer 24 having a given elasticity can prevent a force from the hard thin-walled metal sleeve 26 from being transmitted to the porous material layer 22 so as to serve as a so-called protective layer.

Further, the release layer 28 is made of fluororesin, such as PTFE or PFA. For example, a PFA may be applied onto the outer peripheral surface of the thin-walled metal sleeve 26, or a PFA tube may be disposed to cover the outer peripheral surface of the thin-walled metal sleeve 26.

In the pressing roller 14, a silicone rubber elastic layer 30 is formed around an outer peripheral surface, and then a PTFE or PFA release layer 32 is formed around an outer peripheral surface of the silicone rubber elastic layer 30.

The reference numeral 34 indicates a halogen heater serving as an external heating means for heating a surface of the fixing roller 12 from outside. This halogen heater 34 is disposed in opposed relation to the fixing roller 12 in the vicinity of a transfer-target inlet of the press-contact nip zone N defined between the fixing roller 12 and the pressing roller 14, and the surface of the fixing roller 12 is heated by radiation heat from the halogen heater 34.

In order to effectively heat the fixing roller 12 by radiation heat from the halogen heater 34, a reflector 36 curved to have high reflectivity is disposed on the other side of the fixing roller 12 while interposing the halogen heater 34 therebetween, so as to reflect radiation heat from the halogen heater 34 without diffusion.

The thermistor 38 is disposed in contact with the fixing roller 10 to measure a surface temperature there, and information about the detected surface temperature of the fixing roller 10 is sent to a CPU (not shown) through an A/D converter (not shown). Based on the information, the CPU (not shown) operates to controllably turn on/off the halogen heater 34 to maintain the surface temperature of the fixing roller at a given value.

As mentioned above, the fixing roller 12 has the porous material layer 22 housed therein and the thin-walled metal sleeve 26 disposed on the outer side thereof. Thus, the thin-walled metal sleeve 26 is rapidly heated from outside by the heating means (halogen heater) 34.

In view of machinability, it is undesirable to set the thickness of the thin-walled metal sleeve 26 at an excessively small value. On the other hand, with a focus on machinability, if the thickness of the thin-walled metal sleeve 26 is excessively increased, the rigidity of the thin-walled metal sleeve 26 is increased to cause difficulty in adequately obtaining a nip width of the nip zone N. Thus, the thin-walled metal sleeve 26 of the fixing roller 12 is preferably formed to have a thickness of 10 to 100 μm.

In the fixing roller 12, the porous material layer 22 as an elastic layer having a high heat insulating effect is formed thereinside, and the thin-walled metal sleeve 26 having a thickness of 10 to 100 μm is formed on the outer side thereof. Thus, the fixing roller 12 can be heated up to a given fixing temperature by the external heating member 34 to achieve a reduced worm-up period. This makes to possible to eliminate the need for heating the surface of the fixing roller 12 even in a non-operation state of an image forming apparatus as in a conventional manner, so as to drastically reduce power consumption.

The elasticity of the inside of the fixing roller allows the core 18 of the smaller-diameter pressing roller 12 to be bent so as to eliminate unevenness in the press-contact nip zone N or equalize the nip width in a longitudinal direction of the press-contact nip zone N so as to give a correspond even load to a transfer target to prevent a problem in the transfer target, such as waving.

Further, the fixing roller 12 having elasticity can facilitate increasing the nip width to allow an image forming apparatus to have a higher printing speed.

While the halogen heater 34 is used in the above embodiment as the external heating means for heating the surface of the fixing roller 12 from outside, the heating means in the present invention is not limited to the halogen heater 34, but the fixing device 12 may be heated using an electromagnetic induction heating technique. In other words, the thin-walled metal sleeve 26 may be heated by supplying heat thereto from outside, or may be designed to generate heat by itself.

As one example of modification of the external heating means, an electromagnetic induction heater 40 utilizing an electromagnetic induction heating technique will be described below with reference to FIGS. 11 and 12.

Figure 11:
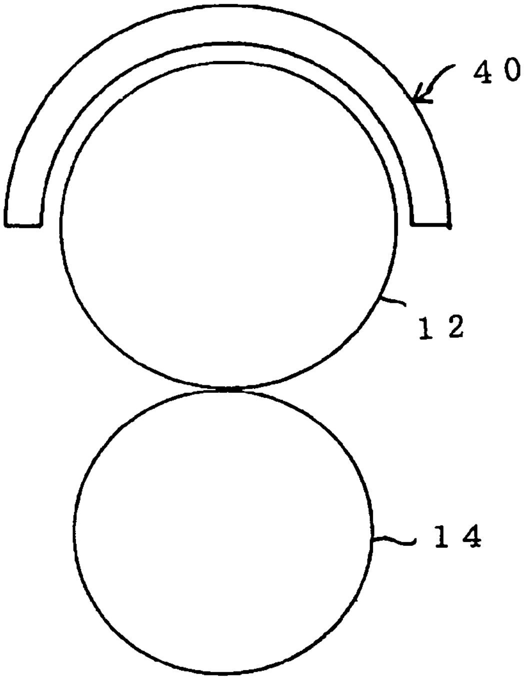
FIG. 11 is a schematic diagram showing one example of modification of the fixing device, wherein an electromagnetic induction heating device is used as an external heating means for heating the fixing roller.
Figure 12:
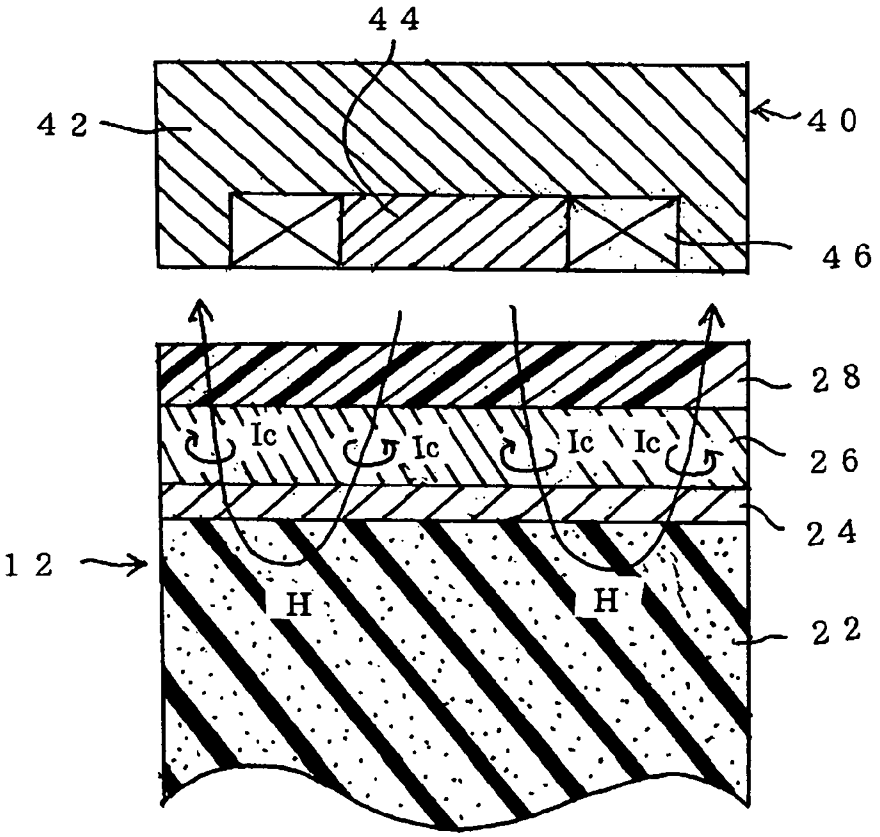
FIG. 12 is a schematic sectional view showing an internal structure of the electromagnetic induction heating device in FIG. 11

As shown in FIG. 11, the electromagnetic induction heater 40 is provided as a means to electromagnetic-induction-heat the thin-walled metal sleeve 26 formed in the fixing roller 12 in a heating region Z. In this example, the electromagnetic induction heater 40 is formed in an arc shape to extend along approximately one-half of the circumference of the fixing roller 12. Specifically, as shown in FIG. 12 in a different sectional direction, the electromagnetic induction heater 40 comprises a nonmagnetic base 42 disposed to extend along the outer peripheral surface of the fixing roller 12 over approximately one-half of the circumference thereof, a magnetic core 44 made, for example, of ferrite, and disposed in a central region of a concave portion formed in a surface of the base 42 opposed to the fixing roller, and an exciting coil 46 wound around the magnetic core 44 and adapted to generate a variable magnetic field H in a radial direction of the fixing roller 12. The electromagnetic induction heater 40 is designed to generate a variable magnetic field H based on energization of the exciting coil 46 by a power supply (not shown) in such a manner as to penetrate in a width direction of the thin-walled metal sleeve 26 of the fixing roller 12 and generate an eddy current Ic in the thin-walled metal sleeve 26 to induce self-heating of the thin-walled metal sleeve 26.

As shown in this modification, as compared with the halogen heater 34, the electromagnetic induction heater 40 used as the external heating means can further rapidly (exponentially) heat the thin-walled metal sleeve 26 of the fixing roller 12 so as to heat an unfixed toner on an unfixed sheet nipped in the nip zone between the fixing roller 12 and the pressing roller 14.

(Production Apparatus 50)

Figure 6:
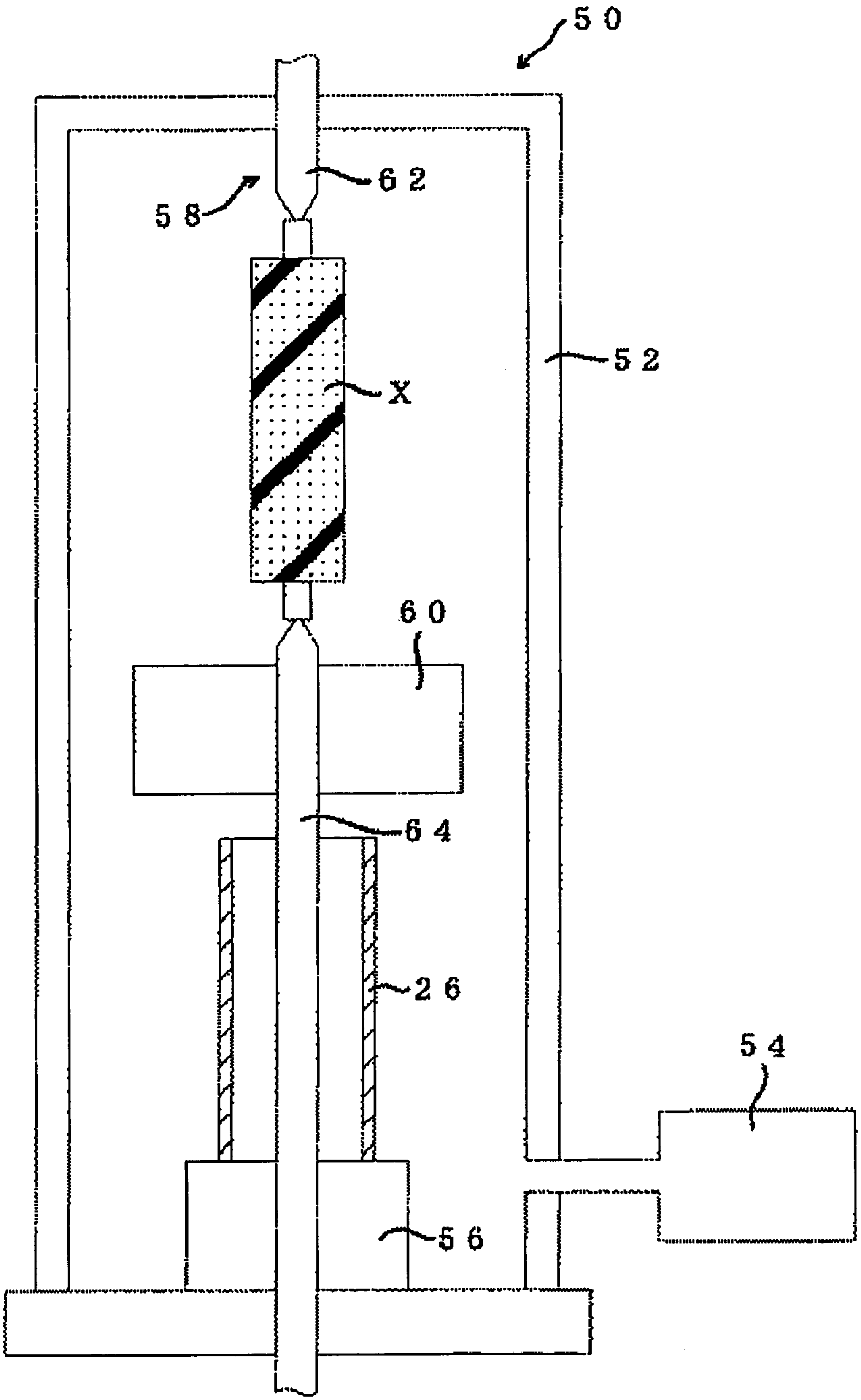
FIG. 6 is a schematic diagram showing a production apparatus for the fixing roller according to the embodiment.

With reference to FIG. 6, a production apparatus 50 for implementing the method for producing the above fixing device will be schematically described.

This production apparatus 50 is designed to reduce an outer diameter of the porous material layer 22 of the fixing roller 12 by a pressure process, then apply an adhesive onto an outer peripheral surface of the porous material layer 22 having a reduced outer diameter, and fittingly insert the porous material layer 22 after the adhesive-application process into the thin-walled metal sleeve 26.

Specifically, this production apparatus 50 is provided with a pressurized container 52 for performing all of the above processes sequentially under a pressurized environment. This pressurized container 52 is fluidically connected to a pressure supply mechanism 54, such as a compressor, and an inner space of the pressurized container 52 can have a high-pressure environment, for example, of 5 MPa, in response to activation of the pressure supply mechanism 54.

In the pressurized container 52, the production apparatus 50 includes a stand 65 for holding the thin-walled metal sleeve 26 in an upstanding posture, a support mechanism 58 for supporting a porous body X comprising the core 14 and the porous material layer 22 disposed around the core 14, in coaxial relation to the thin-walled metal sleeve 26 held by the stand 56, and moving the porous body X while keeping the coaxial relation, and an adhesive application mechanism 60 for uniformly applying an adhesive onto the outer peripheral surface of the porous material layer 22 of the porous body X supported by the support mechanism 58.

The support mechanism 58 includes a pair of upper and lower support shafts 62, 64 coaxially penetrating through the stand 56 and the thin-walled metal sleeve 26 held by the stand 56, so that the porous material layer 22 can be coaxially supported by the support shafts 62, 64. The support shafts 62, 64 are designed to integrally driven and moved by a moving mechanism (not shown) in such a manner as to be additionally moved in a direction spaced apart from one another.

A process of a production method for the aforementioned fixing roller 12 using the above production apparatus will be described in detail below.

Firstly, the core 16 is set in a cavity of an injection molding apparatus. In a die-closed state, an emulsion serving as a raw material of the porous material, for example the emulsion obtained in Example 1, is degassed within a vacuum depressurization device to remove mixed air therefrom. Then, the emulsion is injected into the cavity, and solidified within the cavity under the same conditions as those described in Example 1. Through the above process, the porous body X comprising the core 16 and the silicone elastomer porous material layer 22 disposed surrounding around the outer peripheral surface of the core 16 and formed with at least a plurality of closed cells. After opening the die and taking the porous body X out of the injection molding apparatus, the porous body X is attached to a grinding apparatus (not shown) to grind the outer peripheral surface of the porous body X in such a manner that the porous material layer 22 has a given diameter, for example, of 30.5 mm as an outer diameter size equal to or greater than 30.0 mm which is an inner diameter of the thin-walled metal sleeve 26.

Then, the pressurized container 52 is opened to clamp the porous body X between the pair of upper and lower support shafts 62, 64 of the support mechanism 58, and hold the thin-walled metal sleeve 26 on the stand 56 in an upstanding posture.

Then, the pressurized container 52 is closed, and the pressure supply mechanism 54 is activated to pressurize the porous body X housed in the pressurized container 52 so as to allow the porous material layer 22 to have an outer diameter less than the inner diameter of the thin-walled metal sleeve 26.

Figure 7:
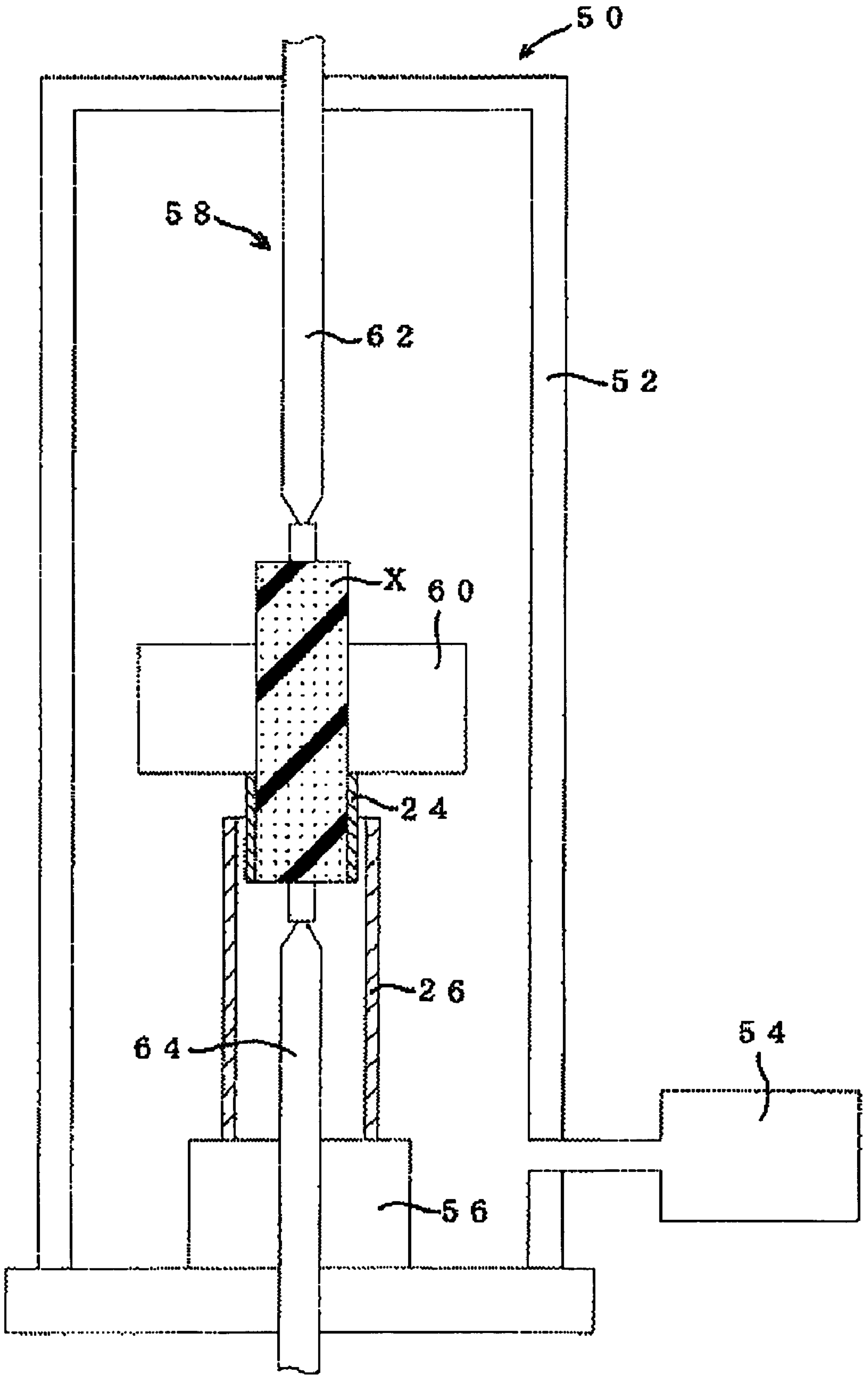
FIG. 7 is a schematic diagram showing the production apparatus in FIG. 6 in a process of applying an adhesive onto an outer peripheral surface of the porous material within a pressurized container.

Then, as shown in FIG. 7, the adhesive-application mechanism 60 is activated. Further, the moving mechanism (not shown) is activated to move the upper and lower support shafts downward, and an adhesive is applied onto at least either one of the outer peripheral surface of the porous body X and the inner peripheral surface of the thin-walled metal sleeve 26, specifically the outer peripheral surface of the porous body X in this embodiment, so as to form the adhesive layer 24.

Figure 8:
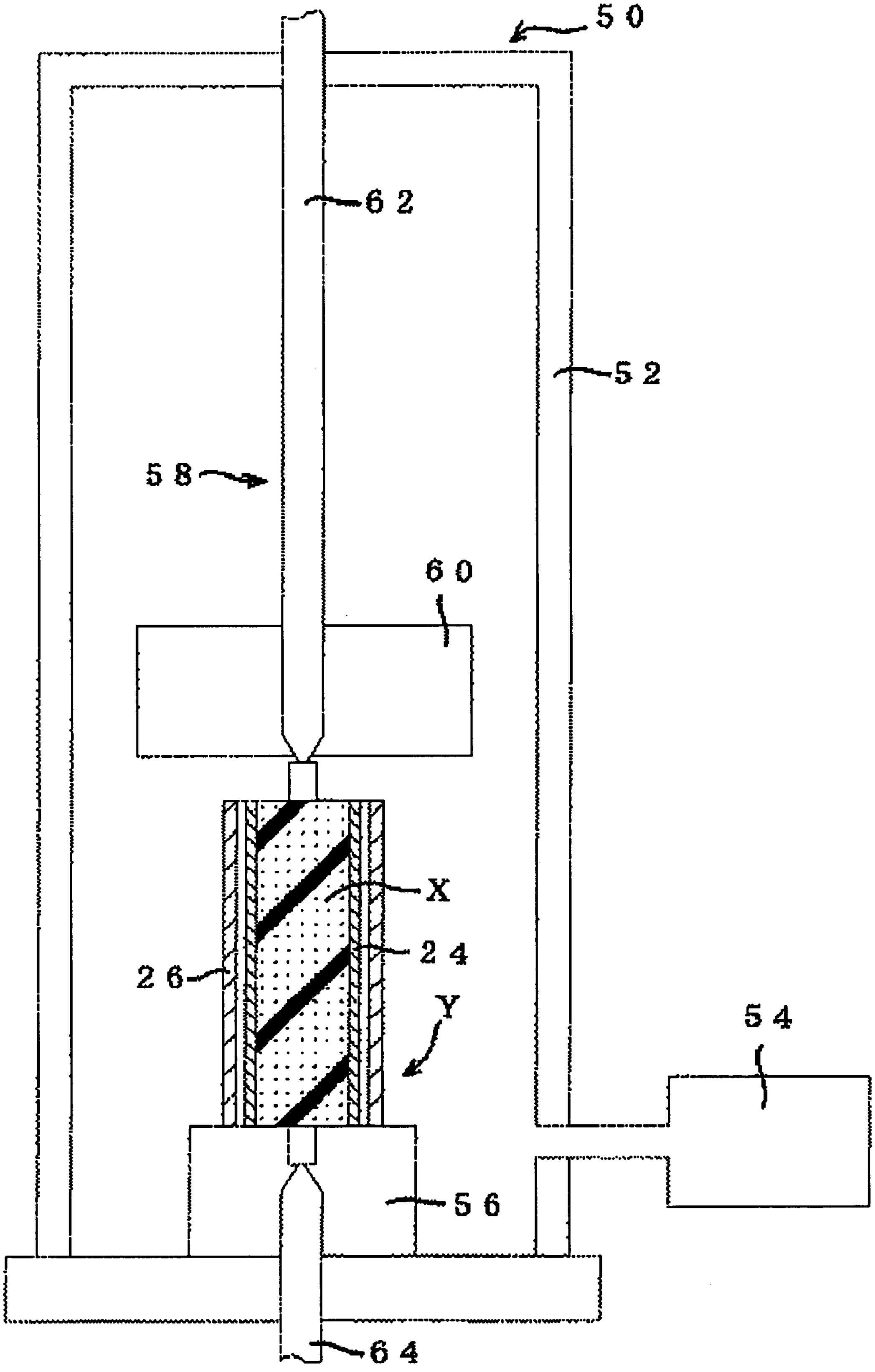
FIG. 8 is a schematic diagram showing the production apparatus in FIG. 6 in a process of forming a sleeve body within a pressurized container.

Then, within the pressurized container 52, the moving mechanism is successively operated to move the upper and lower support shafts downward and inset the porous body X supported therebetween, into the thin-walled metal sleeve 26 so as to form a sleeve body Y as shown in FIG. 8.

Then, after releasing the pressurized state and opening the inner space of the pressurized container 52 to atmosphere, the sleeve body Y formed within the pressurized container 52 in the above manner is taken out of the pressurized container 52 to induce an expansion of the porous material layer 22 of the porous body X so as to bring the outer peripheral surface of the porous material layer 22 into closed contact with the inner peripheral surface of the thin-walled metal sleeve 26. In this close-contacting process, the expansion of the porous material layer 22 is initiated at a time when the pressurized state is released, and completed approximately at the same time as the pressurized state is released.

Then, the adhesive is solidified to bond the porous body X and the thin-walled metal sleeve 26 together. In this bonding process, the sleeve body Y is contained in a constant-temperature bath, and heated at 150° C. for about 30 minutes to bond them together. It is understood that an aging process may be performed after completion of the bonding process based on heating.

The outer peripheral surface of the thin-walled metal sleeve 26 is pre-covered by the release layer 28 made of PFA as fluororesin. Thus, when the bonding process is completed, the fixing roller 12 as a product can be obtained.

It is understood that the fixing roller of the present invention is not limited to above specific embodiment and Examples, and various changes and modifications may be made therein without departing from the spirit and scope of the present invention. Various example of modification of the fixing device according to above embodiment will be described below with reference to the drawings. In the following description, the same element or component as that in the aforementioned embodiment is defined by the same reference numeral, and its description will be omitted.

(Structure of Fixing Roller)

Figure 9:
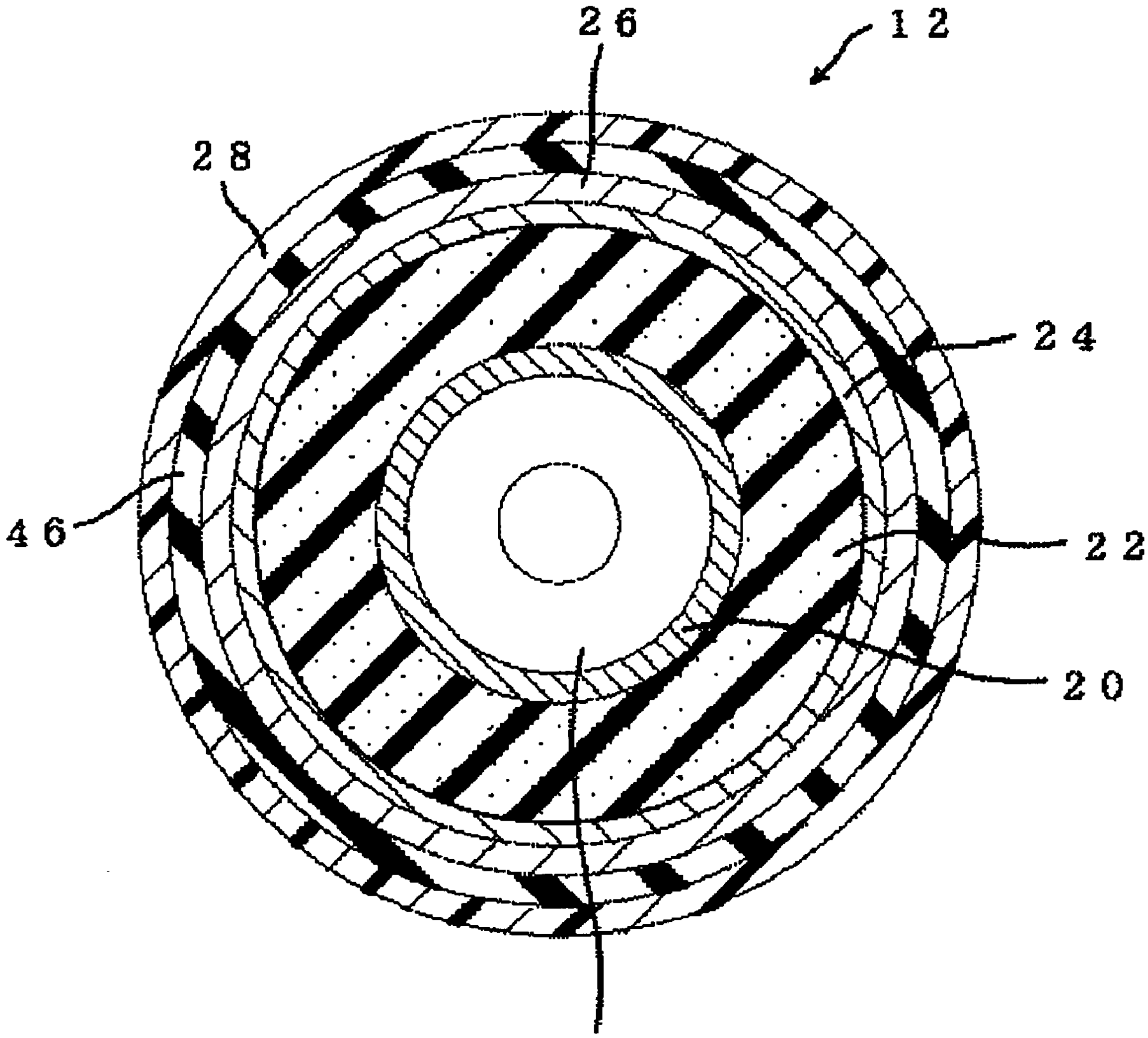
FIG. 9 is a schematic diagram showing one example of modification of the fixing device.

For example, while the release layer 28 in the aforementioned embodiment is formed directly on the outer peripheral surface of the thin-walled metal sleeve 26, the fixing roller 12 is not limited to such a structure. For example, as shown in FIG. 9, before the setting in the injection molding apparatus, the releasing layer 28 is not formed on the outer peripheral surface of the thin-walled metal sleeve 26, but only the elastic layer 48, such as silicone rubber, is formed on the outer peripheral surface of the thin-walled metal sleeve 26. Then, after the thin-walled metal sleeve 26 and the porous material layer 22 are integrated together, the release layer 28 is formed around the outer peripheral surface of the thin-walled metal sleeve 26. That is, the release layer 28 is not an essential component to the present invention, and may be attached or formed at any timing.

(Application of Fixing Roller)

Figure 10:
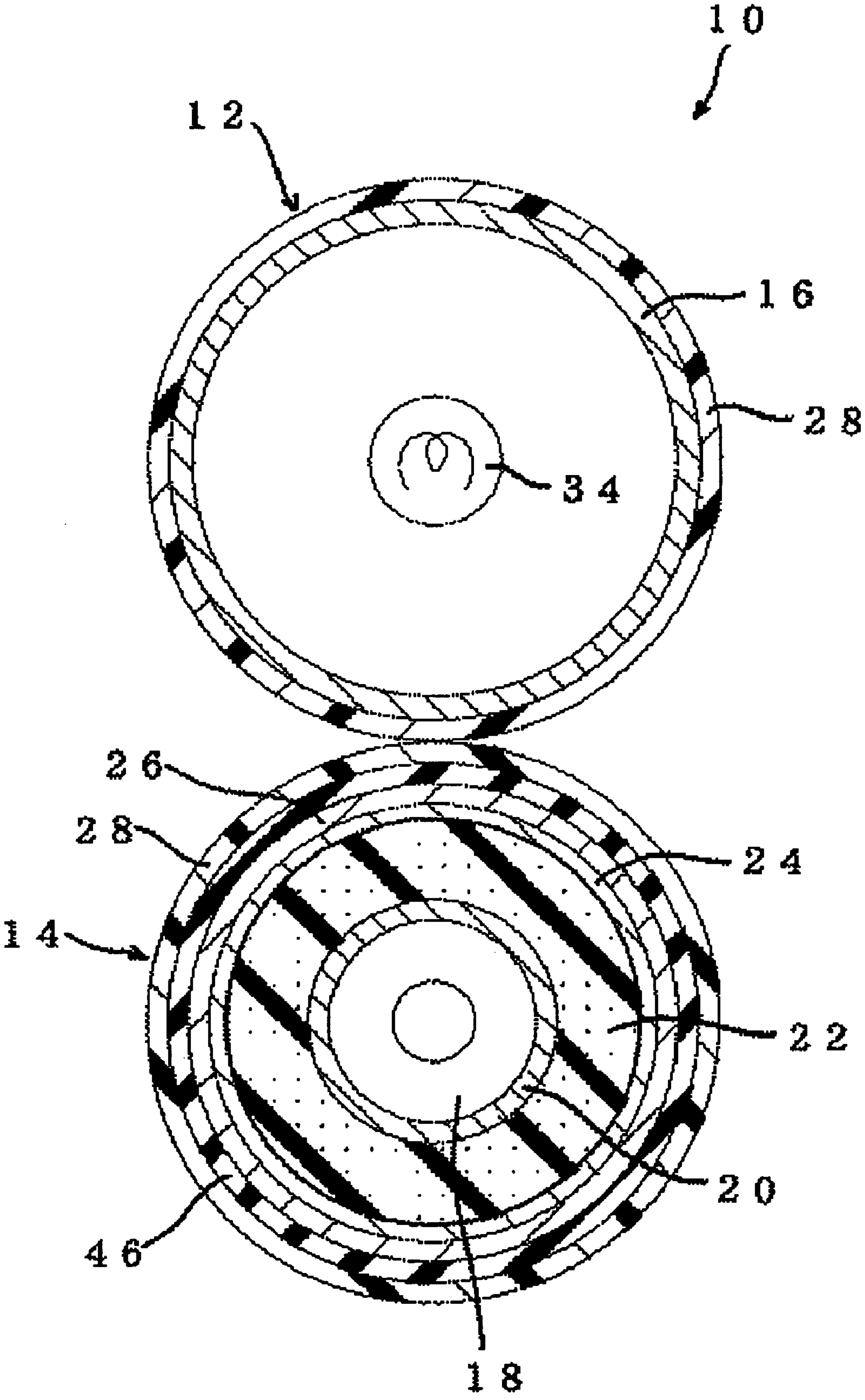
FIG. 10 is a schematic diagram showing another example of modification of the fixing device, wherein the fixing roller is applied to a pressing roller.

While the fixing roller of the present invention is applied to a thermal-fixing roller in the aforementioned embodiment, the present invention is not limited to the thermal-fixing roller, but may be applied to a pressing roller 14 as shown in FIG. 10.

Further, while the production method in the aforementioned embodiment includes reducing the outer diameter of the porous body X by means of pressurization, the outer diameter of the porous body X may be reduced by means of depressurization. What is important is to allow the porous body X to have an pre-insertion outer diameter set at a value less than the inner diameter of the thin-walled metal sleeve 26 when the porous body X is inserted into the thin-walled metal sleeve 26 to form the sleeve body Y, and to have a post-insertion outer diameter substantially equal to or slightly greater than the inner diameter of the thin-walled metal sleeve 26. Thus, any suitable technique capable of achieving such changes may be used. For example, a technique for reducing the diameter the porous body X by means of pressurization or depressurization, using pressure to the porous body X as a parameter, or a technique for increasing the diameter the thin-walled metal sleeve 26 by means of heating or reducing the diameter the porous body X by cooling, using heat as a parameter, may be used.

In the above embodiment, when the porous body X is inserted into the thin-walled metal sleeve 26, the porous body X comprises "the core 16 and the silicone elastomer porous material layer 22 disposed surrounding around the outer peripheral surface of the core 16 and formed with at least a plurality of closed cells". However, the present invention is not limited to this operation. For example, the porous body X consisting only of a hollow silicone elastomer porous material layer 22 without the core 16 may be inserted into the thin-walled metal sleeve 26, and then the core 16 may be inserted into a center hole of the silicone elastomer porous material layer 22 inserted in the thin-walled metal sleeve 26. In this case, even if the silicone elastomer porous material layer 22 has an outer diameter set at a value approximately equal to or slightly greater that the inner diameter of the thin-walled metal sleeve 26, the hollow silicone elastomer porous material layer 22 having no core 16 can be inserted into the thin-walled metal sleeve 26 readily and reliably, or the sleeve body Y can be composed of the porous body X and the thin-walled metal sleeve 26 readily and reliably.

In the aforementioned production process, for forming the porous body X, the core 16 is set in the injection molding apparatus, and an emulsion as a raw material of the porous material is injected around the outer peripheral surface of the core 16 to cover the outer peripheral surface of the core 16 by the porous material layer 2 within the injection molding apparatus. However, the present invention is not limited to this operation. For example, a cylindrical porous body formed with a central insertion hole may be prepared, and then the core 16 may inserted into the cylindrical porous body. That is, any suitable sequence for forming the porous material layer 22 around the outer peripheral surface of the core 16 may be used.

In the aforementioned embodiment, the process for applying an adhesive onto the outer peripheral surface of the porous material layer 22 is performed under pressure within the pressurized container 52 or an adhesive is applied onto the reduced outer peripheral surface of the porous material layer 22. The present invention is not limited to this operation. For example, the adhesive may be applied onto the outer peripheral surface of the porous material layer 22 under atmospheric pressure or the adhesive may be applied onto the outer peripheral surface of the porous material layer 22 before the process of reducing the diameter, to obtain the same effect.

While the release layer 28 in the aforementioned production method is formed through the silicone rubber layer **26*b* as an elastic layer, the present invention, however, is not limited to this operation, but the release layer 28 may be formed directly onto the outer peripheral surface of the sleeve body 26*a* of the thin-walled metal sleeve 26**.

Further, while the PFA tube in the aforementioned embodiment is closely fitted to cover the silicone rubber layer **26*b* in the process of forming the fluororesin release layer 28, the present invention, however, is not limited to this operation. For example, PFA may be coated onto the outer peripheral surface of the thin-walled metal sleeve 26. It is understood that the adhesive nay be applied directly onto the outer peripheral surface of the silicone rubber layer 26*b* formed on the outer peripheral surface of the thin-walled metal sleeve 26**.

Further, while the thin-walled metal sleeve 26 in the aforementioned embodiment is bonded onto the outer peripheral surface of the porous material layer 22 through the adhesive layer 24, the present invention, however, is not limited to this arrangement. For example, as long as the thin-walled metal sleeve 26 can be rotated together with the porous material layer 22 in response to a rotation of the porous material layer 22 in a structure where the thin-walled metal sleeve 26 and the porous material layer 22 are frictionally engaged with one another, and the core 16 is rotatably driven from outside, or as long as the porous material layer 22 (or the core 16) can be rotated together with the thin-walled metal sleeve 26 in a structure where the thin-walled metal sleeve 26 is rotatably driven from outside, the adhesive layer 24 is not indispensable.

What is claimed is:

1. A fixing roller comprising:

a core;

a porous material layer with a plurality of cells comprising a closed cell-type silicone elastomer prepared using an emulsion composition, said porous material layer being disposed in surrounding relation to an outer peripheral surface of said core; and a thin-walled metal sleeve covering an outer peripheral surface of said porous material layer, wherein each of the cells accounting for 50% or more of the total cell number satisfies the following formula:

$$0 \leqq (m-n)/m \leqq 0.5,$$

wherein m represents a maximum diameter of the cell, and n represents a minimum diameter of the cell.

2. The fixing roller as defined in claim 1, wherein said silicone elastomer forming said porous material layer having a plurality of cells with a closed cell ratio of 60% or more, wherein ones of the cells accounting for 50% or more of a total cell number individually have a diameter of 50 μm or less.

3. The fixing roller as defined in claim 2, wherein said silicone elastomer has a closed-cell ratio of 80% or more.

4. The fixing roller as defined in claim 2, wherein each of said cells has a diameter ranging from 0.1 μm to 70 μm.

5. The fixing roller as defined in claim 1, wherein each of the cells accounting for 50% or more of the total cell number satisfies the following formula:

$$0 \leqq (m-n)/n \leqq 0.5,$$

wherein m represents a maximum diameter of the cell, and n represents a minimum diameter of the cell.

6. The fixing roller as defined in claim 5, wherein said silicone elastomer has an average cell diameter of 30 μm or less.

7. The fixing roller as defined in claim 1, wherein said porous material layer is prepared using a water-in-oil emulsion composition which contains a liquid silicone rubber material curable to form a silicone elastomer, a silicone oil material having a surface-active function, and water.

8. The fixing roller as defined in claim 1, which includes a release layer formed around an outer peripheral surface of said thin-walled metal sleeve.

9. The fixing roller as defined in claim 8, which includes an elastic layer interposed between said release layer and said thin-walled metal sleeve.

10. The fixing roller as defined in claim 1, which includes an elastic layer formed on an outer peripheral surface of said thin-walled metal sleeve.

11. The fixing roller as defined in claim 10, which includes a release layer formed on an outer peripheral surface of said elastic layer.

12. The fixing roller as defined in claim 11, wherein said release layer is made of fluororesin.

13. The fixing roller as defined in claim 12, wherein said fluororesin is coated on an outer peripheral surface of said elastic layer.

14. The fixing roller as defined in claim 12, wherein said fluororesin is formed in a tube shape, and cover over an outer peripheral surface of said elastic layer.

15. The fixing roller as defined in claim 11, wherein said release layer is made of fluororesin.

16. The fixing roller as defined in claim 15, wherein said fluororesin is coated on an outer peripheral surface of said elastic layer.

17. The fixing roller as defined in claim 15, wherein said fluororesin is formed in a tube shape, and cover over an outer peripheral surface of said elastic layer.

* * * * *